Aug. 31, 1965

O. W. YANDELL 3,203,239

FLUID MEASURING DEVICE

Filed April 15, 1963

Olen W. Yandell
INVENTOR.

BY Wm T Wofford
Attorney

Aug. 31, 1965  O. W. YANDELL  3,203,239
FLUID MEASURING DEVICE

Filed April 15, 1963  3 Sheets-Sheet 2

Olen W. Yandell
INVENTOR.

BY Wm. T. Wofford
Attorney

Aug. 31, 1965

O. W. YANDELL 3,203,239

FLUID MEASURING DEVICE

Filed April 15, 1963

INVENTOR.
Olen W. Yandell
BY Wm. T. Wofford
Attorney

United States Patent Office 3,203,239
Patented Aug. 31, 1965

3,203,239
FLUID MEASURING DEVICE
Olen W. Yandell, 6741 Fortune Road, Fort Worth, Tex.
Filed Apr. 15, 1963, Ser. No. 278,505
17 Claims. (Cl. 73—202)

My invention relates to apparatus for measuring fluid flow and more particularly to apparatus for measuring the quantity of milk delivered by a cow during a selected milking period. This application is a continuation-in-part of my co-pending application Serial No. 190,895 filed April 30, 1962, now abandoned.

In the modern dairy, milk is not exposed to the atmosphere, but it moves directly from the cow via a pipeline system to storage tanks where it may be treated or cooled. In operating a modern dairy, for many reasons it is desirable to be able to measure accurately the amount of milk which each cow produces. That each cow produces milk in proportion to the amount of feed furnished to it may be the essential difference between profit and loss to the dairyman. Hence, it is most important to provide a practical and efficient milk measuring unit.

It is the general object of the present invention to provide an improved fluid measuring device for use in a manifold milking system to accurately measure the amount of milk produced by individual cows at a milking time.

Another object of the invention is to provide an improved fluid measuring device for the above purpose which is effectively sealed to prevent contamination of the liquid in it.

Another object of the invention is to provide an improved fluid measuring device for the above purpose which is economical to manufacture and durably constructed.

Another object of the invention is to provide an improved fluid measuring device for the above purpose wherein measuring inaccuracies due to foam are minimized.

Another object of the invention is to provide an improved fluid measuring device for the above purpose from which a fluid sample may be taken easily.

Another object of the invention is to provide an improved fluid measuring device for the above purpose which may be quickly and easily emptied without removing it form its support frame.

Another object of the invention is to provide an improved fluid measuring device for the above purpose which can be effectively cleaned and sterilized without being removed from its support frame.

These and other objects are effected by the present invention as will be apparent from the accompanying drawings, forming a part of this application, in which.

Figure 1:
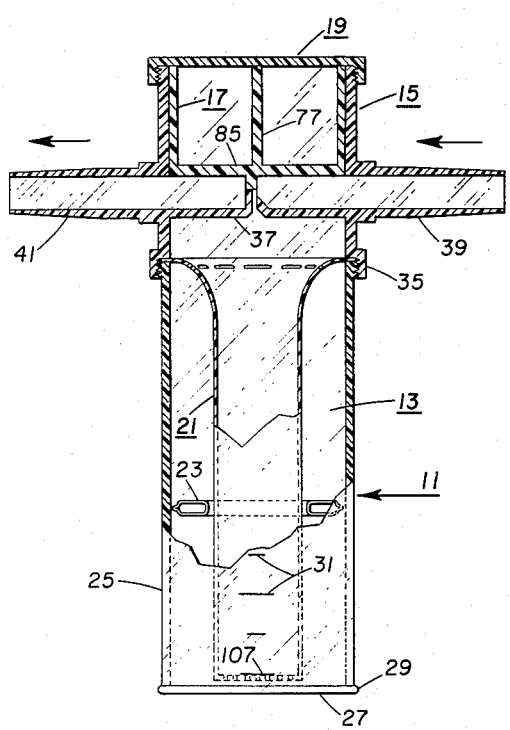
FIG. 1 is a schematic elevational view of a fluid measuring device in accordance with one embodiment of the invention with the near side partially cut away.

Referring now to the drawings, in FIG. 1 there is shown a proportional fluid measuring device 11 (sometimes hereinafter referred to as the measuring device 11) constructed in accordance with one embodiment of the invention. There is provided a measuring chamber 13, a metering head 15 which threadedly engages the measuring chamber 13, an upper orifice plate assembly 17 within the metering head 15, a threaded cap 19 to cover the metering head 15, a foam container 21 within the measuring chamber 13 and a float 23 encircling the foam container 21.

The measuring chamber 13 includes a cylindrical body 25, preferably of clear plastic material. One end of the body 25 is closed by a plate forming a bottom 27 which extends slightly beyond the outer peripheral edge of the body 25 and which is rounded to form a bead 29. On the wall surface of the body 25 there is a graduated scale 31 which may be etched, stamped or otherwise impressed thereon. The level of the fluid in the chamber 13 opposite the graduated scale 31 may indicate in ounces, pounds, quarts, kilograms or any convenient units of measurment, the quantity of fluid that has passed through the metering head. In a preferred embodiment, however, the unit of measurement is the pound. The other end of the body 25 threadedly engages the lower end of the metering head 15.

The metering head 15 includes a cylindrical body portion 33 having outer and inner diameters substantially equal to those of the body 25, except that the lower end 35 is enlarged and threaded internally to receive the upper end of the body 25.

The upper end of the body portion 33 is threaded externally to receive the cap 19. Internally, there is provided a diaphragm 37 disposed transversely of the longitudinal axis of the body portion 33 near the lower end 35. Projecting outwardly from the body portion 33, in diametrically opposed relation, there is an inlet tube 39 and an outlet tube 41. These tubes may be any convenient size or shape. It his been found desirable, however, to use tubes, having an inner diameter of approximately one-half inch, which are disposed so that the top surface of the diaphragm 37 is tangent to the bottom inner surface of both tubes 39, 41.

Figure 3:
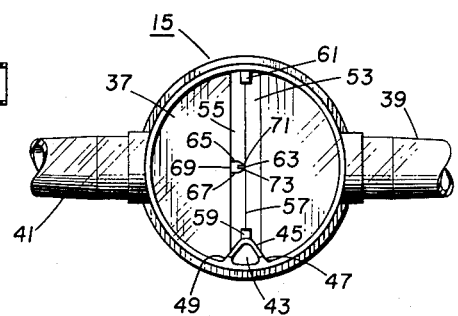
FIG. 3 is a schematic plan view of the metering head of the fluid device of FIG. 1, with the cap and upper orifice plate removed.
Figure 2:
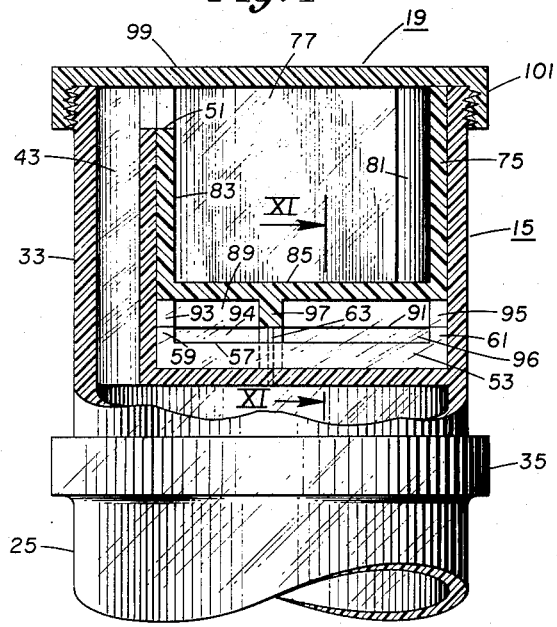
FIG. 2 is a schematic fragmentary elevational view of the metering head of the device of FIG. 1 and including the upper orifice plate and cap.

Referring to FIGS. 2 and 3, there is shown a pour spout 43 adjacent the inner wall of the metering head 15. The pour spout 43 is disposed 90 degrees from the axis of the inlet and outlet tubes 39, 41 and is formed by the arcuate surface 45 which pierces the diaphragm 37 and merges with the inner wall of the metering head in the regions 47, 49. The arcuate surface 45, between the merging regions 47, 49, extends upward to a level somewhat less than the top of the metering head as indicated at 51 in FIG. 2. A portion of the diaphragm 37 on each side of a diameter which is perpendicular to the axis of the tubes 38, 41, slopes upward at approximately 45 degrees. The planes of the sloping sides 53, 55 thus formed intersect in a line 57 which lies in the plane of a diameter which is perpendicular to the plane of the diaphragm 37. A pair of blocks 59, 61 are disposed at the ends of the sloping planes 53, 55 where they intersect the arcuate surface 45 and the opposite inner wall of the body portion 33. The blocks 59, 61 overlie the sloping planes 53, 55 and extend inwardly and upwardly. The distance between the opposed inner surfaces of the blocks 59, 61 determines the length of a flow area as will be hereinafter explained. There is provided, also, in the metering head 15, an orifice 63 which is formed by two parallel plates 65, 67 and a transverse plate 69 bridging between the parallel plates 65, 67 at one end thereof. The plates 65, 67 are disposed parallel to and equally each side of the plane containing the axis of the tubes 39, 41 and perpendicular to the diaphragm 37. The orifice 63, furthermore, is disposed so that the free edge surfaces of the plates 65, 67 lie in the aforesaid plane containing line 57. The plates 65, 67, 69 pierce the sloping side 55 to form a communicating passage through the diaphragm 37. Preferably, the outer surfaces of the plates 65, 67 are tapered toward the free edge of each to form knife-like edges 71, 73.

Figure 4:
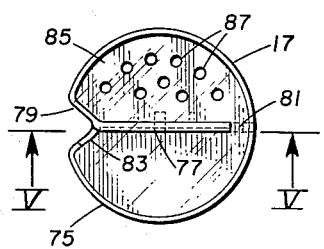
FIG. 4 is a schematic plan view of the upper orifice plate of FIGS. 1 and 2.
Figure 5:
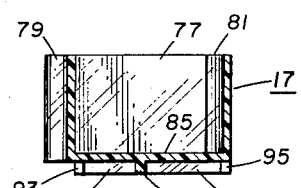
FIG. 5 is a sectional view taken along line V—V of FIG. 4.
Figure 11:
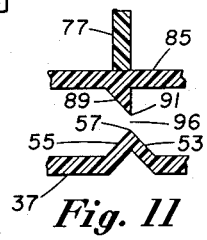
FIG. 11 is a fragmentary cross sectional view taken along lines XI—XI of FIG. 2.

Referring now to FIGS. 4 and 5, there is shown the upper orifice plate assembly 17 having a cylindrically shaped body 75 with an outer diameter substantially the same as the inner diameter of the metering head body 25. A baffle plate main portion 77 is disposed along a diameter within the body 75 perpendicular to a plane which extends transversely of the body 75. An extension portion 79 of the baffle plate is formed to provide a surface which will lie contiguously along the arcuate surface 45 of the pour spout 43. The portion 79 merges with the cylindrical body 75, while the opposed parallel edge of the baffle plate main portion 77 is spaced from and substantially parallel to the inside surface of the body 75, thereby forming an aperture 81. A plate 83 is angularly disposed between the baffle plate and the cylindrical body 75 so that it will lie contiguously along the arcuate surface 45 of the pour spout 43. Another plate 85 is disposed transversely of one end of the body 75 to form a bottom. The upper half of the bottom 85 (as viewed in FIG. 4) is pierced by a plurality of holes 87 affording communicating passages through it. To the lower surface of the bottom 85 there is attached a triangular bar (see FIG. 11). One surface of the bar 89 is perpendicular to the bottom 85 and lies in a plane containing the aforesaid line 57. The other surface of the bar 89 slopes upward toward the perforated zone of the bottom 85, at about 45 degrees, or at substantially the same angle of slope as the sloping side 53. Thus, there is formed a downwardly projecting surface terminating in a transverse knife edge 91. The triangular bar 89 merges at each end into blocks 93 and 95 which have substantially the same dimensions as the blocks 59 and 61 and which are integral with the underside of the bottom 85. Another block 97 is integral with the underside of the perforated portion of the bottom 85 and the triangular bar 89. The block 97 is disposed along a diameter perpendicular to the plane of the baffle plate 77. The block 97 has a length substantially equal to the length of the plates 65, 67, and a width substantially equal to the distance between the outer surfaces of the plates 65, 67. The thickness of the block 97 is substantially equal to the depth of the triangular bar 89.

The heights of the opposing pairs of blocks 59, 93, and 61, 95 are made such that in assembly the lower outer surface of the bottom plate 85, to which the blocks 93 and 95 are attached, is tangent to the top inner surface of the tubes 39, 41. Likewise, the inner surface of the diaphragm 37, to which the blocks 59, 61 are attached, is tangent to the bottom inner surface of the tubes 39, 41. The height of the blocks 93, 95 and 97 and the distance between the opposed surfaces 59, 67 and 61, 65, determine the area of the fluid flow passages 94, 96 lying in juxtaposed relation to the orifice 63. The total area of the flow passages 94, 96 in a preferred embodiment of the invention is made approximately 37.5 times the area of the orifice 63. The fluid flow passages 94, 96 are bounded lengthwise by the opposed surfaces of the blocks 59, 61 and the corresponding opposed surfaces of the plates 67, 65; and vertically by the distance between the edges 57 and 91.

The cap 19, as shown in FIG. 2, includes a circular plate 99 which is integral with an internally threaded ring 101. The cap 19 threadedly engages the upper end of the body portion 33. Preferably, the plate 99 abuts the top edge surfaces of the baffle plate 77, 79 and the orifice plate body 75.

Figure 9:
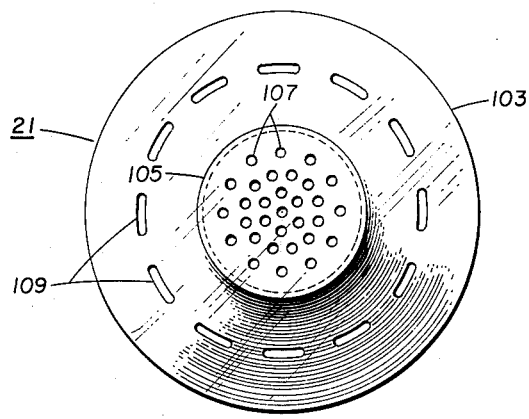
FIG. 9 is a schematic plan view of the bottom of a foam container.

Referring to FIGS. 1 and 9, there is shown the foam container 21. The body portion 103 of the foam container is cylindrical and has a diameter which is approximately one-third the diameter of the measuring container body portion 25. Across one end of the body portion 103, there is a plate forming a bottom 105, which is perforated by a plurality of holes 107 of any suitable diameter. If desired, the foam container 21 may be constructed without a bottom; in which case the bottom edge of the side wall would terminate near the inside surface of the bottom 27. The opposed end of the body portion 103 is flared sharply outwardly to a diameter substantially equal to the outer diameter of the body 25. A plurality of perforations or slots 109, of any suitable shape and size, are provided in the flared portion of the body 103 for a purpose to be hereinafter explained. The body portion 103 has a length which is nearly equal to the inside length of the body portion 25, so that when placed within the device as shown in FIG. 1 the bottom plate 105 is displaced a small distance from the inside surface of the bottom 27.

Figure 10:
FIG. 10 is a schematic cross sectional view of a float or fluid level indicator.

In FIG. 10 there is illustrated the fluid level indicator or float 23 which includes a torus-shaped body having two parallel planar surfaces 111, 113 connected outwardly by an arcuate surface 115 and inwardly by another arcuate surface 117. In a preferred embodiment, the arcuate surface 115 is formed having a tongue 119 which grids the float 23 approximately at the median planar region between the planar surfaces 111, 113. The outer surface of the tongue 119 may be marked as by etching, anodizing, painting or in any convenient manner, so that the tongue 119 of the float will be distinguishable against the scale 31 and will indicate the level of liquid in the device 11.

Figure 8:
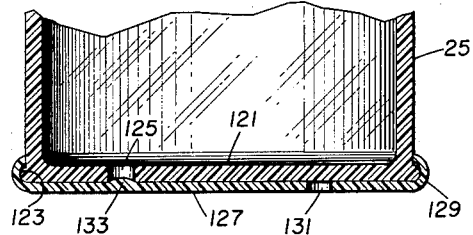
FIG. 8 is a schematic fragmentary sectional view showing a portion of the device in accordance with a modification of my invention.

In FIG. 8 there is shown a modification of the bottom 27 of the embodiment of FIG. 1. A bottom plate 121, having an arcuate peripheral edge 123, extends transversely of the lower end of the body portion 25 and projects slightly beyond the outer surface of the body portion.

There is provided in the bottom plate 121, at any convenient radius from the center, an aperture which may be of any convenient shape and size. Preferably, the aperture is circular and may be about one-fourth inch in diameter. Overlying the bottom plate 121, there is another plate 127. This plate has an arcuate edge 129 which is adapted to embrace and contain the arcuate edge 123. The plate 127 is provided, also, with an aperture 131 of similar size and shape as the aperture 125. The apertures 125, 131 are disposed at the same radius from the center of the respective plates 121, 127. The plate 127 is adapted to cooperate with the edge 123 in a fluid-tight sealing relation. But, the cooperative relation between plates 121, 127 admits of rotating the bottom plate 127 until the apertures 125, 131 are aligned, whenever it is desired to take a sample of milk for analysis or other purposes. A detent 133 is provided on the surface of the plate 127 in contact with the plate 121, and is adapted to engage the aperture 125. The detent 133 seals the aperture and provides resistance to the inadvertent rotation of the bottom plate 127. If desired, a pour spout may be provided at the location of the aperture 131.

Figure 6:
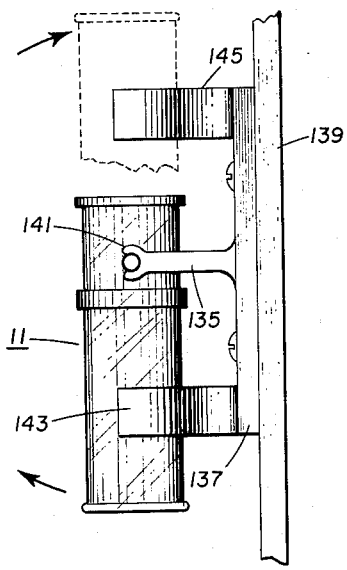
FIG. 6 is a schematic side elevational view showing the device mounted on its support frame.
Figure 7:
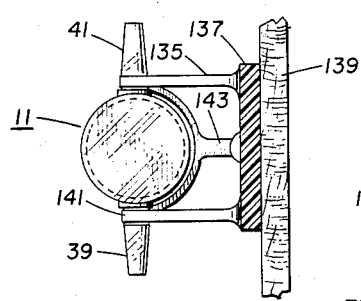
FIG. 7 is a schematic plan view of the device as shown in FIG. 6.

A convenient and practical arrangement for supporting the device 11, when in use, is illustrated in FIGS. 6 and 7. The device 11 may be supported by a pair of brackets 135 which project outwardly from a base structure 137. The base structure 137 may be mounted on any suitable upstanding structure 139 such as a post, wall or stanchion, which is available in the milking area. The free end of each bracket 135 is provided with a jaw 141 for embracing the inlet tube 39 and outlet tube 41. Above and below the brackets 135 there is a lower yoke 143 and an upper yoke 145. The lower yoke 143 embraces the measuring chamber 13 when the device is in use. The upper yoke 145 likewise embraces the measuring chamber 13, when the device is rotated in the jaws 141 to the position shown in phantom in FIG. 6.

Now, in order to describe the manner in which the device 11 is used to measure the quantity of milk produced by a cow at a milking period, reference is made to FIGS. 1 and 2. In a modern milk manifold pipeline system there is generally a vacuum pump, a pulsator, one or more milking machines, a collection tank, and a system of manifold piping connecting these units, none of which is shown in the drawings since such systems are well known to those skilled in the art. The device of the present invention may be installed in such a milking system so that the milk flows into the device via the inlet tube 39 and from the device via the outlet tube 41.

Those skilled in the art will recognize that the slight negative pressure or vacuum, which exists in the milk manifold system, under normal operating conditions, causes the milk to flow from the cow to the input tube 39. Thereafter, the milk flows into the lower right hand portion (as viewed in FIG. 1) of the metering head 15. In flowing through the metering head toward the outlet tube 41, most of the milk flows through the main flow passages 94, 96. A proportional amount, however, will enter the orifice 63 and flow into the measuring chamber 13. The larger volume of milk which flows through the flow passages 94, 96 enters the lower left hand portion of the metering head 15. Some of the milk may flow through the holes 87 and enter the upper orifice plate. Nevertheless, most of the milk will flow from the metering head into the outlet tube 41 and thence to the milk manifold piping system. It should be noticed that since the lower edges of the fluid flow areas 94, 96 and the lower edge of the orifice 63 are all at a common level, the fluid proportioning is accurate, even at low flow rates. Also, it is important for accuracy that these lower edges be maintained as nearly as possible in a horizontal plane.

When the milking process is concluded, the total amount of milk produced by the cow may be read on the calibrated scale opposite the tongue 119 on the float 23. It should be noted that the milk enters the measuring chamber 13 by flowing first into the foam container 21 and then via the apertures 107 in the bottom of the foam container upwardly within the annulus between the foam container and the measuring chamber outer wall 25. This means that the foam will appear only within the foam container 21, and that there will be no foam on the milk upper surface within the aforementioned annulus, which upper surface carries the float 23. Consequently the float indicia tongue 119 is entirely free of foam and may be easily and accurately observed.

Thereafter, without removing the device from its support and without opening the device to a possible contaminating atmosphere, the milk in the measuring chamber 13 may be dumped into the manifold system. This is easily accomplished by simply rotating the device in the jaws 141 to the inverted position, as indicated in phantom in FIG. 6. In such an inverted position, most of the milk will flow via the pouring spout 43 and over the arcuate surface edge 51 into the upper orifice plate assembly 17. Thence, it will flow through the holes 87 into the lower left hand portion of the metering head 15 and into the outlet tube 41. A small portion of the milk will flow through the orifice 63 into the metering head 15 and thence into the outlet tube 41.

When it is desired to draw a sample of milk to test it for butter fat content or for other purposes, a small sampling tube, cup or other receptacle may be held against the bottom of the plate 127 covering the aperture 131. Thereafter, the plate 127 may be rotated until the apertures 125 and 131 are aligned. After a sufficient sample of milk has been withdrawn the plate 127 may be rotated until the detent 133 engages the aperture 125, whereupon the detent seals the aperture 125.

The process of cleaning and sterilizing the device is both simple and effective. There being a minimum of parts, it is easy to remove the device from its mounting bracket and to disassemble it completely for a thorough cleaning and sterilization of the component parts. Although not so shown by the drawings in every case, it is preferred that all angles or corners formed by internal surfaces of the device which intersect perpendicularly, or nearly so, be provided with a small radius fillet.

It has been found desirable to limit the physical size of the device to flow measuring capacity of about 50 pounds of milk, which is equivalent to about 47 pints; this being the maximum amount of milk a cow would normally be expected to produce at a single milking period. The device in a preferred embodiment may be constructed with a measuring chamber 13 about three inches in outside diameter and about two and three-quarters inches inside diameter at the top; it is about six inches high and the graduated scale 31 is calibrated to read directly in pounds of milk. The main flow passages 94, 96 and the orifice are of the same height, which is about one-eighth inch. The combined lateral width of the flow passages 94, 96 is about one and three-quarters inches. Consequently, the lateral width of the orifice 63 is about three sixty-fourths inch. This it will be noticed, is in the ratio of 37.5 to 1 with respect to the combined width of the main flow passages 94, 96.

While the preferred embodiment has both a substantially cylindrical measuring chamber 13 and a cylindrical measuring head 15, it will be recognized that the measuring chamber may have any convenient size or shape as long as the capacity of the chamber 13 is of sufficient size to receive the largest proportionate volume of liquid which may be delivered to it at any one time. Likewise, the orifice 63 and the fluid flow areas 94, 96 may have any convenient size and shape as long as they are juxtaposed at the same fluid level and the combined area of both fluid flow passages 94, 96 is approximately 37.5 times the area of the orifice 63.

As for materials of construction, the device may be made of any suitable materials such as glass, plastics, stainless steel and the like. Preferably, however, the metering head 15, the cap 19, the upper orifice plate assembly 17, and the float 23 are made of a rigid clear plastic. The foam container 21 and the plate 127 may be made of a semi-rigid plastic such as polypropylene. It is preferred that the measuring chamber 13 be made of a clear plastic, such as polycarbonate. The support structure, which includes the brackets 135, base structure 137, upstanding structure 139, jaws 141 and the lower and upper yokes 143, 145 may be made of a plastic such as polypropylene. It should be understood that the fluid measuring device disclosed herein can be effectively employed without the foam container 21 and the float 23, if desired.

Figure 12:
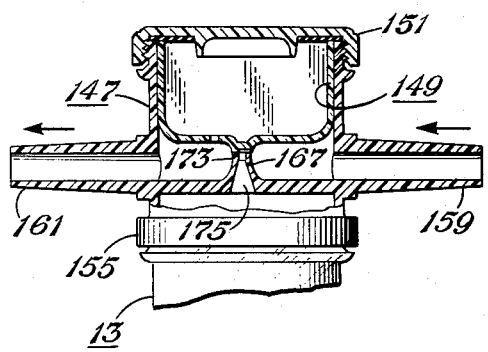
FIG. 12 is a schematic elevational view of a fluid measuring device in accordance with another embodiment of the invention, with the near side partially cut away in a central vertical plane and with only the upper portion of the measuring chamber being shown.

The portion of the modified form of the present invention shown in FIG. 12 includes a metering head 147, wherein is lodged an upper orifice plate assembly 149, and a metering head top closure or cap 151.

The modified form of metering head 147 includes a cylindrical body portion 153 having outer and inner diameters substantially equal to those of the body 25 (see FIG. 1), except that the lower end 155 is enlarged and threaded internally to receive the upper threaded end of the body 25.

The upper end of the body portion 153 is threaded externally to receive the top closure or cap 151. Internally, there is provided a diaphragm 157 disposed transversely of the longitudinal axis of the body portion 153 near its lower end 155. Projecting outwardly from the body portion 153, in diametrically opposed relation along an axis of fluid flow, there is both an inlet tube 159 and an outlet tube 161. These tubes may be any convenient size or shape. It has been found desirable, however, to use tubes, having an inner diameter of approximately one-half inch, which are disposed so that the top surface of the diaphragm 157 is tangent to the bottom inner surface of both tubes 159, 161.

Figure 14:
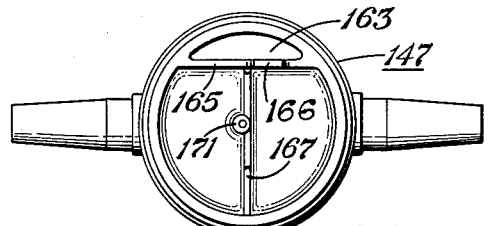
FIG. 14 is a schematic plan view of the metering head of FIG. 12 and 13, with the cap and cap sealing gasket removed.
Figure 16:
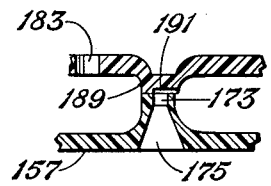
FIG. 16 is an enlarged sectional detail view taken at line XVI—XVI of FIG. 13.
Figure 13:
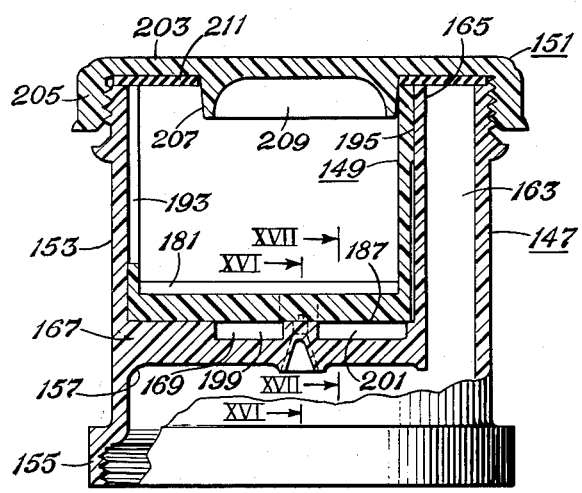
FIG. 13 is a schematic fragmentary elevational view of the metering device of FIG. 12 including the upper orifice plate and cap with the near side partially cut away in a central plane normal to the vertical plane of FIG. 12.

Referring to FIGS. 13 and 14, there is shown a modified form of a pour spout 163 which is adjacent the inner wall of the metering head 147 and which is formed by a baffle plate 165 and a portion of the wall of the cylindrical body portion 153. The baffle plate 165 is disposed in spaced parallel relation to the axis of the inlet and outlet tubes 159, 161 and is perpendicular to the diaphgram plate 157. A notch 166 is formed in the upper portion of the baffle plate for a purpose to be hereinafter explained. A rib 167 is integrally formed with the diaphragm 157 and is disposed on the upper surface thereof, on the diameter which is generally perpendicular to the axis of the inlet and outlet tubes 159, 161. The top planar surface 168, of the rib 167, is rectangular in shape and is disposed parallel to the plane of the diaphragm 157, as seen in FIG. 13. A notch 169, which has a generally rectangular cross section, is formed in the rib 167, for a purpose that will be hereinafter explained. A cylindrical tubular member 171 is integrally formed with and extends above the diaphragm 157. The tubular member 171 is so located that its longitudinal axis is perpendicular to the diaphragm and intersects the axis of the inlet and outlet tubes 159, 161. Moreover, the cylindrical tubular member 171 is disposed slightly toward the outlet tube 161 so that the cylindrical top surface of the tubular member 171 is coplanar with the rectangular top surface 168 of the rib 167 and is substantially tangent to that side of the rib 167 which is nearest the inlet tube 159. Both the cylindrical tubular member 171 and the diaphragm 157 are pierced by a longitudinal fluid flow passage comprising a cylindrical passage 173 that merges with a divergent fluid passage 175, as shown in FIG. 16. The purpose of these fluid passages 173, 175 will be hereinafter explained.

Figure 15:
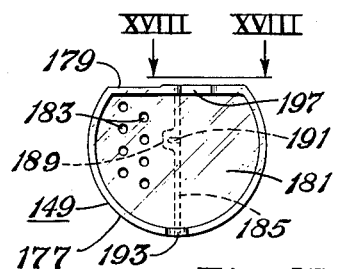
FIG. 15 is a schematic plan view of the upper orifice plate of the device shown in FIGS. 12 and 13.
Figure 17:
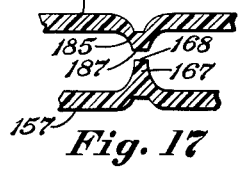
FIG. 17 is an enlarged sectional detail view taken at line XVII—XVII of FIG. 13.
Figure 18:
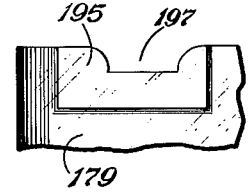
FIG. 18 is a schematic fragmentary detail view taken at line XVIII—XVIII of FIG. 15.

Referring now to FIGS. 15 and 18, there is shown the upper orifice plate 149, which has a cylindrical shaped body portion 177 having an outer diameter that is substantially the same as the inner diameter of the metering head body portion 147. The cylindrical shaped body portion 177 merges with a flat planar back portion 179. A generally planar member 181 is disposed transversely of one end of both the cylindrical body portion 177 and the back portion 179 to form a bottom. The left half of the member or bottom 181 (as viewed in FIG. 15) is pierced by a plurality of holes 183 affording fluid flow passages through the bottom. To the lower surface of the bottom 181, there is integrally attached another rectangular rib 185 (see FIG. 17), which is disposed perpendicularly to the plane of the back portion 179 on a diameter of the cylindrical body portion 177. The bottom planar surface 187, of the rib 185, is also rectangular in shape and is disposed parallel to the plane of the bottom 181, as seen in FIGS. 13 and 17. A generally rectangular shaped block member 189 is integrally formed on the bottom 181 and merges with the rib 185. The bottom rectangular surface of the block member 189 is coplanar with the bottom surface of the rib 185. A groove 191 is formed in the bottom surfaces of rib 185 and the block member 189 and its axis is generally perpendicular to the axis of the rib 185. The purpose of this groove 191 and its general disposition will be hereinafter described. The cylindrical body portion 177 is provided with a slot 193 extending from its upper edge downward to a location just above the bottom 181. The axis of the slot 193 is conveniently located in the vertical plane of rib 185. The back portion 179, as seen in FIG. 18, is provided with a generally rectangular shaped pad 195, which is integrally formed with the back portion 179. In the upper edge of the back portion 179 there is a generally rectangular groove or notch 197 which has arcuate opposite sides that merge with the bottom and top as shown in FIG. 18. The notch 197 matches with the notch 166, both being located on the upstream side of the ribs 167, 185.

The upper orifice plate assembly 149, as mentioned hereinbefore, is lodged and restrained within the metering head portion 147. When so lodged therein, the bottom surfaces 187, of both the rib 185 and the block member 189, adjoin the top planar surfaces 168, of both the rib 167 and the tubular member 171. Thus, the notch 169 is formed into two fluid flow regions 199, 201, as shown in FIG. 13, and the purpose of the notch 169 is thus explained. Also, it will be noticed that the axis of the groove 191 intersects the axis of the fluid passages 173, 175 and so there is fluid communication via the groove 191 and passages 173, 175, as will be seen in FIG. 16.

The top closure or cap 151, as shown in FIG. 12, includes a circular plate 203 which is intregally formed together with an internally threaded ring 205. A truncated conical member 207, having a depression or well 209 located in the central region thereof, is integrally formed with and projects from the lower surface of the top closure or cap 151. The truncated conical member 207 has such a diamater at the bottom that, when the top closure or cap 151, together with an annular gasket 211 of rubber, plastics or other suitable material, is threaded on the upper end of the metering head 147, the sloping side wall of the conical member engages the back portion 179 applying pressure to the contact of the pad 195 with the baffle plate 165. It may be noticed that while the gasket 211 forms an effective fluid seal along the top edges of the metering head 147 and the upper orifice plate assembly 149, it does not seal at the location of the notches 166, 197. For proper operation of the measuring device it is necessary that a first region beneath the upper orifice plate assembly 149 on the downstream side of the ribs 167, 185 and the measuring chamber 13 shall have substantially the same pressure (degree of vacuum). This requirement is met because the holes 183, the notches 166, 197 and the pour spout 163 provide communication between the first region above mentioned and the measuring chamber. At the same time, the pressure in a second region beneath the upper orifice plate assembly 149 on the upstream side of the ribs 167, 185 must be greater (lesser degree of vacuum) than in the first region. Unless there is an effective seal at the notches 166, 197, small amounts of milk will tend to move upward from the second region between the adjacent walls of the upper orifice plate assembly and the pour spout, and this milk will flow over the notch 166 and into the measuring chamber. Since this milk has bypassed the metering orifice 191 it falsely indicates that a quantity of milk equal to 37½ times its volume has flowed through the device. Thus, the lack of an effective seal at the region of the notches 166, 197 can seriously affect the accuracy of the device. The pad 195 is provided to aid in effecting an adequate seal at the region of the notches 166, 197. The action of the conical member 207 in applying pressure to the contact of the pad 195 and the baffle plate 165 further enhances the seal at the region of the notches 166, 197. At the same time, the conical member 207 is disposed so that it will prevent any milk that may spurt upwardly through the holes 183 under certain conditions, from entering the pour spout.

It was mentioned hereinbefore that the device 11 of the present invention may be conveniently installed in a modern milk manifold pipeline system by connecting a fluid conduit hose to the inlet tube and a fluid conduit hose to the outlet tube. The same device 11 incorporating the modified form of metering head 147, upper orifice plate assembly 149, and metering head top closure or cap 151, may likewise be installed in a milk manifold system.

The milk will flow via the inlet tube 159 into the lower right hand portion (as viewed in FIG. 12) of the metering head 147. In flowing through the metering head toward the outlet tube 161, most of the milk flows through the main fluid flow regions 199, 201. However, a small proportional amount will enter the groove or orifice 191 and flow via it and the fluid flow passages 173, 175 into the body portion 25 of the measuring chamber 13 (see FIG. 1). Thus, the purposes of the groove or orifice 191 and the fluid flow passages 173, 175 are explained. The larger volume of milk, which flows through the fluid flow regions 199, 201, enters the lower left portion of the metering head 147. Some of the milk may flow through the holes 183 and enter the upper orifice plate. Nevertheless, most of the milk will flow from the metering head into the outlet tube 161 and thence to the regular milk manifold piping system.

And so, as mentioned hereinbefore, when the milking process is concluded, the total amount of milk produced by the cow may be read on the calibrated scale 31 of the measuring chamber 13.

The modified form of metering head, upper orifice plate assembly and metering head top closure or cap, in no way, alter or change the basic procedure to install and use the device 11, as described hereinbefore.

In a typical embodiment of the modified form of metering head and upper orifice plate assembly, the lateral width of the combined cross sectional area which is perpendicular to the axis of flow through the fluid flow regions 199, 201, is one and one-sixteenth inches, and the height is one-sixteenth of an inch. The lateral width of the groove or orifice 191 is one-sixteenth of an inch and its height (or depth) is approximately twenty-nine and one-half thousandths of an inch. Therefore, it will be noticed, the ratio of the respective cross sectional area of the fluid flow regions 199, 201 to the cross sectional area of the orifice 191 is approximately 37.5 to one. This it will be remembered, is also the ratio of the combined cross sectional areas of the fluid passages 94 and 96 to the cross sectional area of the orifice 63. Hence, the modified form of metering head, upper orifice plate assembly and metering head top or cap may be reliably used with the measuring chamber 13.

The location of the orifice 191 in the modified form of the metering head 147 has several advantages. It is simpler to make and easier to clean. Also, the orifice size can be changed when desired by simply changing the upper orifice plate assembly. Further, the accuracy of fluid flow measurement is improved.

While I have shown the invention in several forms, it will be obvious to those skilled in the art that these forms are not so limited, but they are susceptible of various changes and modifications without departing from the spirit thereof.

I claim:

1. A device for proportionately measuring the quantity of milk flowing in a manifold milking system, which device comprises: a metering head including a first chamber defined by a top, a bottom and a sidewall; said metering head including also a plate assembly; said plate assembly having the form of a cup with a sidewall and a plate bottom closure, said cup nesting within said first chamber with said plate being disposed in spaced relation above said first chamber bottom to form an intermediate closure within said first chamber, said plate bottom closure defining with said first chamber bottom a fluid flow channel; a fluid inlet conduit and a fluid outlet conduit oppositely disposed in said sidewall and protruding outwardly therefrom defining an axis of rotation and communicating with said fluid flow channel on opposite sides thereof; orifice means interposed in said fluid flow channel; a measuring chamber removably fixed to the bottom end of said metering head; first fluid passage means communicating between said orifice means and said measuring chamber; second fluid passage means in said orifice plate on the downstream side of said orifice means; third fluid passage means communicating between said first chamber above said plate bottom closure and said measuring chamber, with the inlet to said first fluid passage means being above said plate bottom closure and adjacent said first chamber top; a mounting bracket, and means on said bracket for removably receiving said metering head conduit protuberances for pivoting movement about said axis of rotation.

2. A device for proportionately measuring the quantity of milk flowing in a manifold milking system, which device comprises: a metering head including a first chamber defined by a removable top, a bottom and a sidewall; said metering head including also a plate assembly; said plate assembly having the form of a removable cup with a sidewall and a plate bottom closure, said cup nesting within said first chamber with said plate being disposed in spaced relation above said first chamber bottom to form an intermediate closure within said first chamber, said plate bottom closure defining with said first chamber bottom a fluid flow channel; a fluid inlet opening and a fluid outlet opening in said sidewall and communicating with said fluid flow channel on opposite side thereof; orifice means interposed in said fluid flow channel; a measuring chamber removably fixed to the bottom end of said metering head; first fluid pasage means communicating between said orifice means and said measuring chamber; second fluid passage means in said plate on the downstream side of said orifice means; and third fluid passage means communicating between said first chamber above said plate bottom closure and said measuring chamber, with the inlet to said first fluid passage means being above said plate bottom closure and adjacent said first chamber top.

3. A device for proportionately measuring the quantity of milk flowing in a manifold milking system, which device comprises: a metering head including a first chamber defined by a top, a bottom and a sidewall; said metering head including also a plate assembly; said plate assembly including a plate disposed in spaced relation above said first chamber bottom to form an intermediate closure within said first chamber, said plate defining with said first chamber bottom a fluid flow channel; a fluid inlet conduit and a fluid outlet conduit in said sidewall protruding outwardly therefrom and defining an axis of rotation and communicating with said fluid flow channel on opposite sides thereof; orifice means interposed in said fluid flow channel; a measuring chamber removably fixed to the bottom of said metering head; first fluid passage means communicating between said orifice means and said measuring chamber; second fluid passage means in said plate on the downstream side of said orifice means; and third fluid passage means communicating between said first chamber above said plate and said measuring chamber, with the inlet to said third fluid passage means being above said plate and adjacent said first chamber top; a mounting bracket, and means on said bracket for removably receiving said metering head conduit protuberances for pivoting movement about said axis of rotation.

4. A device for proportionately measuring the quantity of milk flowing in a manifold milking system, which device comprises: a metering head including a first chamber defined by a top, a bottom and a sidewall; said metering head including also a plate assembly; said plate assembly including a plate disposed in spaced relation above said first chamber bottom to form an intermediate closure within said first chamber, said plate defining with said first chamber bottom a fluid flow channel; a fluid inlet opening and a fluid outlet opening in said sidewall and communicating with said fluid flow channel on opposite sides thereof; orifice means interposed in said fluid flow channel; a measuring chamber; first fluid passage means communicating between said orifice means and said measuring chamber; second fluid passage means in said plate on the downstream side of said orifice means; and third fluid passage means communicating between said first chamber above said plate and said measuring chamber, with the inlet to said third fluid passage means being above said plate and adjacent said first chamber top.

5. A device for proportionately measuring the quantity of milk flowing in a manifold milking system comprising: a liquid measuring chamber; a metering head having a first chamber defined by a bottom, a sidewall and a top closure; said metering head having a fluid input opening and a fluid output opening; an upper plate removably disposed within said first chamber and having a bottom defining with the bottom of said first chamber and a portion of said sidewall a fluid flow channel communicating between said fluid input and output openings; means interposed in said fluid flow channel and transversely thereof defining a fluid flow aperture having a predetermined area; orifice means interposed in and transversely of said fluid flow channel and having a predetermined area; and a fluid passage means communicating between said orifice means and said measuring chamber.

6. The invention as set forth in claim 5, wherein said orifice means is made up of cooperating integral portions of said first chamber and said plate.

7. The invention as set forth in claim 6, wherein the size of said orifice means is determined by the size of the cooperating integral portion of said plate.

8. The invention as set forth in claim 7, wherein fluid flow aperture is defined by cooperating integral portions of said first chamber and said plate.

9. The invention as set forth in claim 8, wherein the plane of the upstream side of the said fluid flow aperture is adjacent the upstream side of said orifice means.

10. The invention as set forth in claim 8, wherein said orifice means is disposed inwardly of the lateral extremities of said fluid flow aperture.

11. The invention as set forth in claim 10, wherein said orifice means is disposed above the upper extremity of said fluid flow aperture.

12. A device for proportionately measuring the quantity of milk flowing in a manifold milking system, which device comprises: a metering head including a first chamber defined by a removable top closure, a bottom and a sidewall; a plate assembly in the form of a cup having a bottom and a sidewall, said assembly being nested within said first chamber with the bottom disposed in spaced relation above said first chamber bottom to define with said chamber bottom a fluid flow channel; the sidewall of said assembly mating with the sidewall of said chamber above said assembly bottom; a fluid inlet opening and a fluid outlet opening in said metering head sidewall and communicating with said fluid flow channel on opposite sides thereof; orifice means interposed in said fluid flow channel; a measuring chamber removably fixed to said metering head beneath said chamber bottom; first fluid passage means communicating between said orifice means and said measuring chamber; second fluid passage means in said plate on the downstream side of said orifice means; and third fluid passage means communicating between said first chamber above said assembly bottom and said measuring chamber, with the inlet to said third fluid passage means being in the form of mating slots adjacent and merging with the upper margins of said sidewalls; a gasket cooperating with said top closure to seal the upper margins of said sidewalls; and a protuberance integral with the inside of said top closure and in pressure contact with said assembly sidewall adjacent said slots when said top closure is in operative position on said head.

13. A device for proportionately measuring the quantity of milk flowing in a manifold milking system comprising: a liquid measuring chamber; a metering head having a chamber defined by a bottom, a sidewall and a top closure; said metering head having a fluid opening and a fluid output opening; a plate removably disposed within said first chamber; a fluid flow aperture having a predetermined area defined by cooperating integral portions of said first chamber bottom and said plate and disposed in the path of fluid flow between said input and output openings; orifice means formed by cooperating integral portions of said first chamber bottom and said plate adjacent said aperture and having a predetermined area; and fluid passage means communicating between said orifice means and said measuring chamber.

14. A device for proportionately measuring the quantity of a liquid flowing in a system, which device comprises: a metering head having a fluid input conduit and a fluid output conduit; orifice means for diverting a proportionate part of fluid from said metering head; a liquid measuring chamber; a foam container disposed within said measuring chamber in spaced relation to the walls thereof; fluid aperture means communicating between the bottom region of said container and said chamber; and fluid conduit means communicating between said orifice and said foam container.

15. A device for proportionately measuring the quantity of a liquid flowing in a system, which device comprises: a metering head having a fluid input conduit and a fluid output conduit; orifice means for diverting a proportionate part of a fluid from said metering head; a liquid measuring chamber; a foam container disposed within said measuring chamber in spaced relation to the walls thereof; fluid aperture means communicating between the bottom region of said container and said chamber; fluid conduit means communicating between said orifice and said foam container; measuring indicia associated with said measuring chamber; and an indicia float disposed within said chamber exteriorly of said foam container.

16. A device for proportionately measuring the quantity of a liquid flowing in a system, which device comprises: a metering head having a fluid input conduit and a fluid output conduit; orifice means for diverting a proportionate part of a fluid from said metering head, a liquid measuring chamber; a foam container disposed within said measuring chamber in spaced relation to the walls thereof; first fluid aperture means communicating between the bottom region of said container and said chamber; second fluid aperture means communicating between the top region of said container and said chamber; fluid conduit means communicating between said orifice and said foam container; measuring indicia associated with said measuring chamber; and an indicia float encircling said foam container.

17. A device for proportionately measuring the quantity of a liquid flowing in a system, which device comprises: a metering head having a fluid input conduit and a fluid output conduit; orifice means for diverting a proportionate part of a fluid from said metering head; a liquid measuring chamber; a foam container having a cylindrical body disposed within said measuring chamber in spaced relation to the walls thereof; first fluid aperture means communicating between the bottom region of said container and said chamber; second fluid aperture means communicating between the top region of said container and said chamber; fluid conduit means communicating between said orifice and said foam container; measuring indicia associated with said measuring chamber; and a float encircling said foam container, said float incorporating indicia adapted for cooperation with said measuring indicia.

References Cited by the Examiner

UNITED STATES PATENTS

| 1,649,214 | 11/27 | Lewis | 73—422 |
| 2,322,018 | 6/43 | Huber | 73—422 |
| 3,013,431 | 12/61 | Splettstoeser | 73—202 |

RICHARD C. QUEISSER, *Primary Examiner.*